US011226639B2

(12) United States Patent
De Tarso Ferreira et al.

(10) Patent No.: US 11,226,639 B2
(45) Date of Patent: Jan. 18, 2022

(54) ENHANCED TAKE-OFF SYSTEM

(71) Applicant: Embraer S.A., São José dos Campos-SP (BR)

(72) Inventors: Daniel Paulo De Tarso Ferreira, São José dos Campos (BR); Thomas Kestenbach, São José dos Campos (BR); Luiz Gustavo Medeiros Carneiro, São José dos Campos (BR); Patrice London Guedes, São José dos Campos (BR); Jose Roberto Ferreira De Camargo Clark Reis, São José dos Campos (BR)

(73) Assignee: Yaborã Indústria Aeronáutica S.A., São José dos Campos-SP (BR)

( * ) Notice: Subject to any disclaimer, the term of this patent is extended or adjusted under 35 U.S.C. 154(b) by 0 days.

(21) Appl. No.: 15/273,986

(22) Filed: Sep. 23, 2016

(65) Prior Publication Data

US 2018/0088593 A1 Mar. 29, 2018

(51) Int. Cl.

| | |
|---|---|
| ***G05D 1/06*** | (2006.01) |
| ***B64C 13/50*** | (2006.01) |
| ***B64C 5/02*** | (2006.01) |
| ***B64C 9/00*** | (2006.01) |
| ***B64C 13/18*** | (2006.01) |
| ***G05D 1/08*** | (2006.01) |

(52) U.S. Cl.

CPC ............ *G05D 1/0661* (2013.01); *B64C 5/02* (2013.01); *B64C 9/00* (2013.01); *B64C 13/18* (2013.01); *B64C 13/503* (2013.01); *B64C 13/506* (2018.01); *G05D 1/0808* (2013.01); *B64C 2009/005* (2013.01)

(58) Field of Classification Search

None

See application file for complete search history.

(56) References Cited

U.S. PATENT DOCUMENTS

| | | | |
|---|---|---|---|
| 3,681,580 | A | 8/1972 | Gwathmey et al. |
| 3,822,047 | A | 7/1974 | Schuldt, Jr. |

(Continued)

FOREIGN PATENT DOCUMENTS

| | | |
|---|---|---|
| EP | 1586969 A1 | 10/2005 |

OTHER PUBLICATIONS

Smithsonian Institute, "How Things Fly—How efficient tailless airplane is better than tail plane?", Smithsonian Institute, Jun. 2, 2012, https://howthingsfly.si.edu/ask-an-explainer/how-efficient-tailless-airplane-better-tail-plane (Year: 2012).*

(Continued)

*Primary Examiner* — David P. Merlino

(74) *Attorney, Agent, or Firm* — Nixon & Vanderhye P.C.

(57) ABSTRACT

An automatic takeoff flight control system controls an aircraft to automatically follow a predetermined set of control parameters upon taking off from the ground using both longitudinal and lateral control laws. The control system provides takeoff speed reduction to thereby reduce the takeoff distance (TOD) and, as a consequence, increase the takeoff weight (TOW). The control system sets the horizontal stabilizer (HSTAB) in a non-trimmed condition—named "mistrim"; and provides beta for optimum climb at takeoff, through lateral-directional surfaces commands.

16 Claims, 8 Drawing Sheets

(The Enhanced Takeoff System)

(56) References Cited

U.S. PATENT DOCUMENTS

| | | | |
|---|---|---|---|
| 3,945,590 | A | 3/1976 | Kennedy, Jr. et al. |
| 5,527,002 | A | 6/1996 | Bilange et al. |
| 6,422,517 | B1 | 7/2002 | DeWitt et al. |
| 6,546,317 | B2 | 4/2003 | Bousquet |
| 6,643,568 | B2 | 11/2003 | Chatrenet et al. |
| 7,281,683 | B2 | 10/2007 | Delaplace et al. |
| 8,738,199 | B2 * | 5/2014 | Sauvinet .............. G05D 1/0083 701/4 |
| 8,793,040 | B2 | 7/2014 | Guedes et al. |
| 9,096,307 | B2 * | 8/2015 | Sauvinet .................. B64C 9/32 |
| 9,696,724 | B1 * | 7/2017 | Arons .................... B64D 31/06 |
| 10,479,481 | B2 * | 11/2019 | Beaufrere ................. B64C 5/02 |
| 2002/0099479 | A1 * | 7/2002 | Chatrenet ............ G05D 1/0077 701/15 |
| 2005/0230564 | A1 * | 10/2005 | Yamane .................. B64C 13/18 244/183 |
| 2005/0242235 | A1 | 11/2005 | Delaplace et al. |
| 2007/0124034 | A1 * | 5/2007 | Pitard .................. G05D 1/0083 701/15 |
| 2008/0135688 | A1 * | 6/2008 | Villaume ............. G05D 1/0661 701/5 |
| 2008/0188999 | A1 * | 8/2008 | Mathieu ............... G05D 1/0083 701/7 |
| 2009/0171518 | A1 | 7/2009 | Yamane |
| 2010/0028150 | A1 | 2/2010 | Lawson |
| 2011/0040431 | A1 * | 2/2011 | Griffith ................ G05D 1/0661 701/15 |
| 2011/0121140 | A1 | 5/2011 | Yamane et al. |
| 2012/0316706 | A1 * | 12/2012 | Guedes ................ G05D 1/0661 701/15 |
| 2013/0197726 | A1 | 8/2013 | Muller et al. |
| 2015/0083850 | A1 * | 3/2015 | Moser ....................... B64C 9/16 244/99.2 |
| 2017/0351269 | A1 * | 12/2017 | Demortier ............... B64C 13/16 |
| 2018/0086430 | A1 * | 3/2018 | Beaufrere ................. B64C 5/02 |
| 2019/0086937 | A1 * | 3/2019 | Lee .......................... B64C 5/02 |

OTHER PUBLICATIONS

NASA, “Airplane Parts and Function”, May 5, 2015, https://www.grc.nasa.gov/www/k-12/airplane/airplane.html (Year: 2015).*

Perry, D. H., “The Airborne Path During Take-off for Constant Rate-of-Pitch Manoeuvres,” Ministry of Technology, Aeronautical Research Council, Her Majesty’s Stationery Office, C.P. No. 1042, SBN 11 470169 5, 1969, 35 pages.

Extended European Search Report issued in European Application No. 17190574.8 dated Aug. 3, 2018 (14 pages).

Partial European Search Report issued in European Application No. 17190574.8 dated May 3, 2018 (16 pages).

* cited by examiner (The Enhanced Takeoff System)

ENHANCED TAKE-OFF SYSTEM

CROSS-REFERENCE TO RELATED APPLICATIONS

None.

STATEMENT REGARDING FEDERALLY SPONSORED RESEARCH OR DEVELOPMENT

None.

FIELD

The example non-limiting technology herein relates to flight controls, avionics, aircraft performance, and auto flight, and more particularly to autopilot systems and methods for controlling an aircraft to automatically follow a predetermined set of control parameters upon taking off from the ground. More particularly, the technology herein relates to auto takeoff systems using both longitudinal and lateral control laws.

BACKGROUND & SUMMARY

Throughout aviation history, increased levels of automation have decreased pilot workload, improved situational awareness and trajectory control precision, and as a result have significantly contributed to continuously higher safety levels and increased operational efficiency. It would be advantageous to further improve existing systems to introduce automatisms into the take-off process.

BRIEF DESCRIPTION OF THE DRAWINGS

The following detailed description of exemplary non-limiting illustrative embodiments is to be read in conjunction with the drawings of which.

DETAILED DESCRIPTION OF PREFERRED EMBODIMENTS

Almost all piloting tasks from the early days have become automated in a modern day cockpit. However, one task remains to be performed by the pilot on every certified aircraft until today: the take-off maneuver from rotation up to initial climb. Automatic takeoff, without pilot actions, allows for an improvement in the Takeoff Distance (TOD) and therefore in the Takeoff Weight (TOW).

The basic principle is a takeoff profile optimization, as was already described in commonly-assigned U.S. Pat. No. 8,793,040 B2 entitled "Climb-Optimized Auto Takeoff System", incorporated herein by reference. The present non-limiting technology aims to consider other performance improvements related to automatic takeoff.

Figure 1:
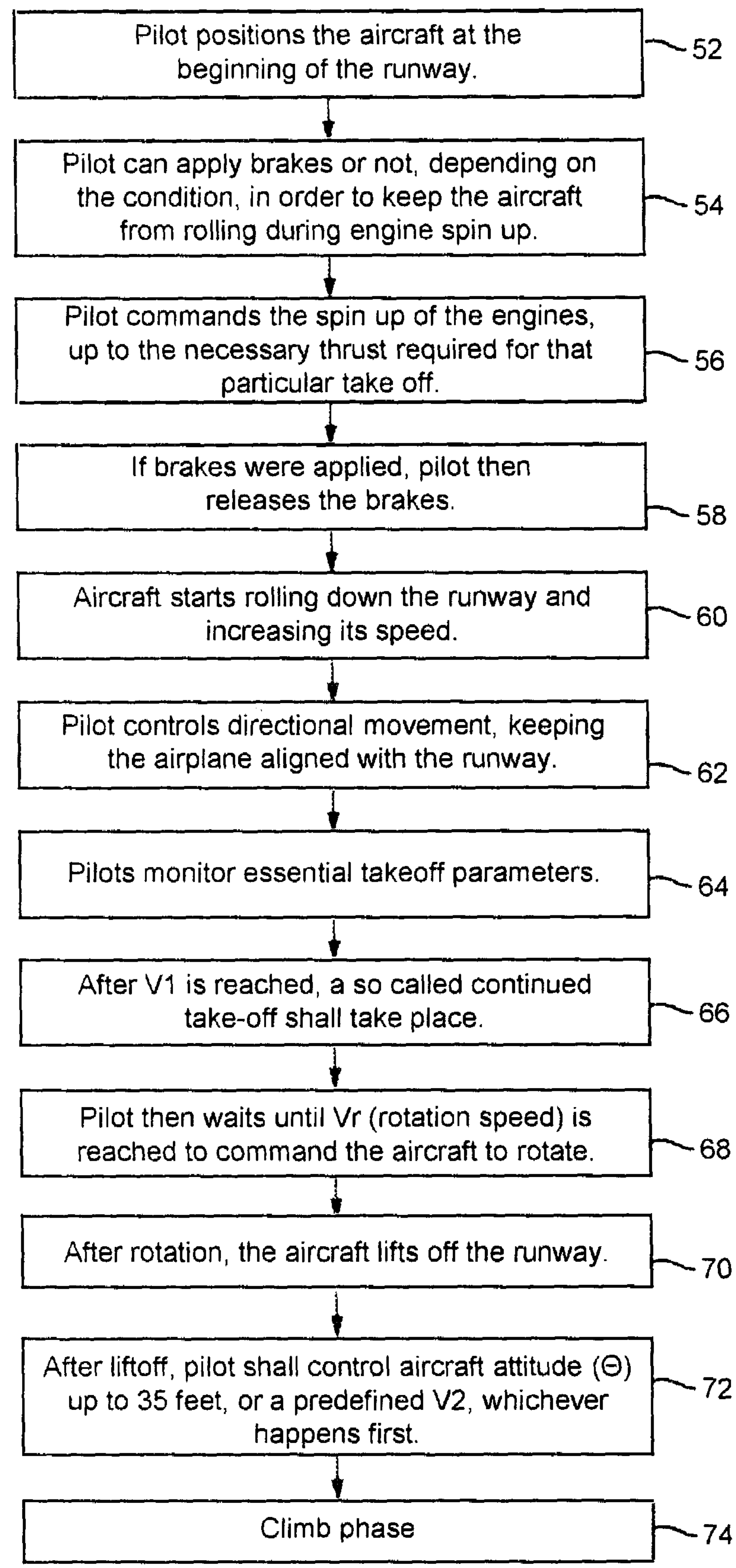
FIGS. 1 and 2 show an example non-limiting aircraft takeoff operating sequence.

It is known that a normal aircraft take-off procedure for commercial airplanes is comprised of the following phases shown in FIG. 1:

Pilot positions the aircraft at the beginning of the runway (52).

Pilot can apply brakes or not, depending on the condition, in order to keep the aircraft from rolling during engine spin up (54).

Pilot then commands the spin up of the engines, up to the necessary thrust required for that particular take off (56).

If brakes were applied, pilot then releases the brakes (58).

Aircraft starts rolling down the runway and increasing its speed (60).

Pilot controls directional movement, keeping the airplane aligned with the runway (62).

Pilots monitor essential takeoff parameters (64).

After V1 ("decision speed") is reached, a so called continued take-off shall take place (66).

Pilot then waits until Vr (rotation speed) is reached to command the aircraft to rotate (68).

After rotation, the aircraft lifts off the runway (70).

After liftoff, pilot shall control aircraft attitude (theta or $\theta$) up to 35 feet, or a predefined V2, whichever happens first (72). V2 is the minimum speed that needs to be maintained up to acceleration altitude, in the event of an engine failure after V1. Flight at V2 ensures that the minimum required climb gradient is achieved, and that the aircraft is controllable.

The 35 feet screen height marks the end of the takeoff phase of the flight, giving away to the climb phase (74).

Figure 2:
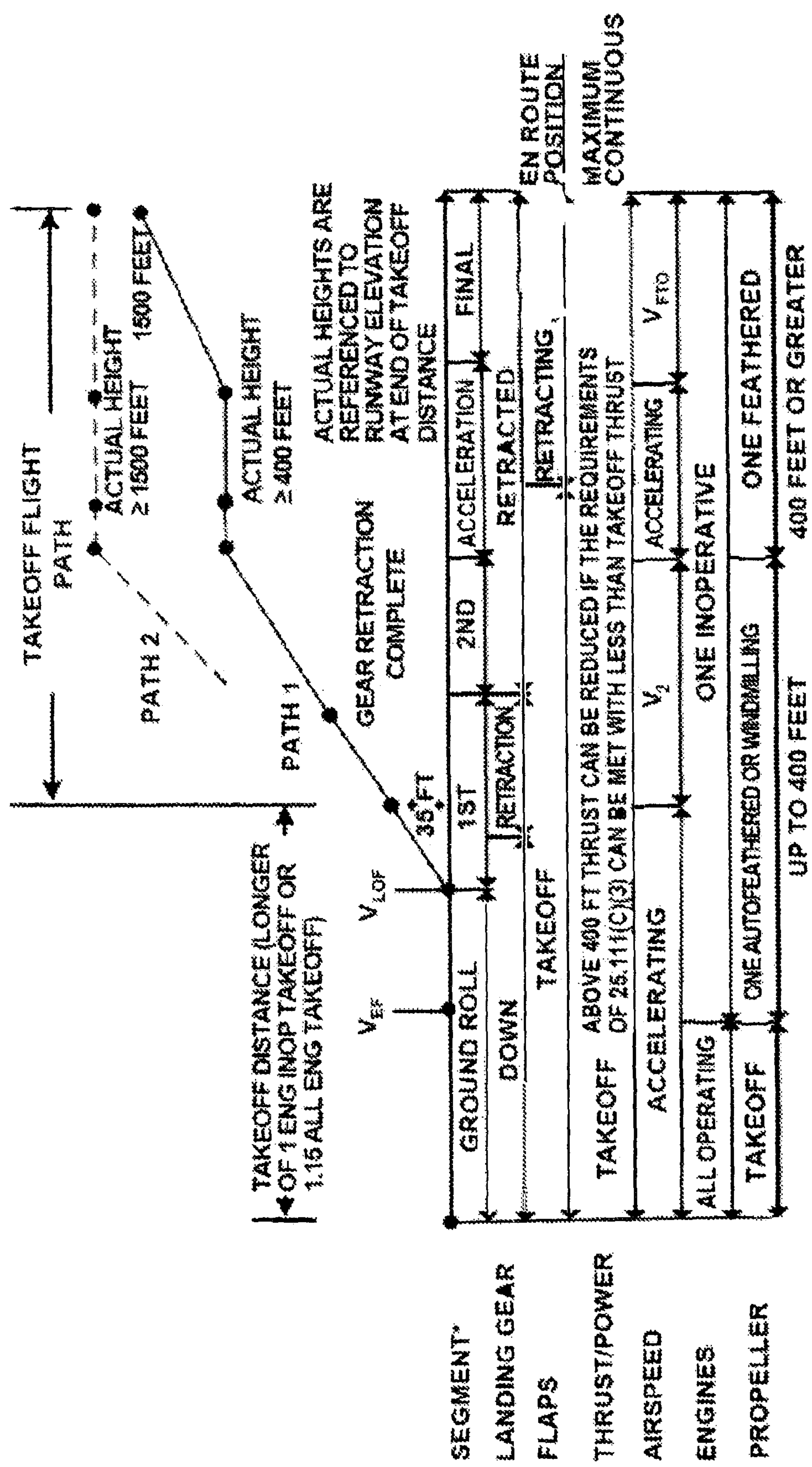

According to the current U.S. Department of Transportation Federal Aviation Administration Advisory Circular Flight Test Guide For Certification Of Transport Category Airplanes (AC 25-7C Oct. 16, 2012) incorporated herein by reference, takeoff phases are divided as shown by FIG. 2. In this diagram, path 1 depicts a flight path based on a minimum 400 foot level-off for acceleration and flap retraction following the second segment climb portion of the flight path. Path 2 depicts the upper limit of the takeoff flight path following an extended second segment. Depending on obstacle clearance needs, the second segment may be extended.

In accordance with non-limiting embodiments herein, some segments of FIG. 2 are noteworthy:

Ground Roll and Ground Distance: From the starting position of the aircraft up to the moment the aircraft lifts off the ground.

1st segment: From lift off up to the moment where the landing gear is fully retracted.

2nd segment: From the end of 1st segment up to the point where the aircraft reaches 400 ft above runway level, or the level off altitude, whichever is greater.

An innovative use of automation during the takeoff phase is able to increase safety and performance levels. Below, example non-limiting system implementation aspects are covered first, including control strategies in vertical and lateral axes. Then, example non-limiting performance improvements are further explained.

Enhanced Take-Off System ("ETS") Overview

In order to provide improvements in safety and operational efficiency through automation, two aspects of system design desirably should be achieved simultaneously in example non-limiting embodiments: high integrity and high availability. The proposed system fulfills these goals by implementing its function within the existing closed-loop fly-by-wire architecture which already needs to comply with similar design goals during the takeoff phase.

In one non-limiting embodiment, no additional input signals are required to control the aircraft trajectory during the takeoff maneuver.

The pilot interface is defined using the same concepts applied for standard autopilot operations, using the same controls and annunciations whenever possible. This greatly reduces the possibility of pilot error and therefore allows a seamless incorporation of new functionality.

The pilot instructs the flight computer of the pilot's desire to perform an automated takeoff through the pilot cockpit interface (e.g., Multi-Function Control Display Unity—MCDU). From there on, the standard takeoff preparation tasks are performed such as flap configuration, vspeeds insertion, horizontal stabilizer positioning and flight director activation.

The existing takeoff configuration monitor is adapted to verify all necessary conditions for the ETS function and alert the pilot if any is not available.

Finally, moving throttles forward activates the ETS function at the start of the takeoff roll. Mode and engagement status indications are provided to the crew through a standard flight mode annunciator, along with standard flight director commands for pilot monitoring.

Pilot inceptors are locked in position in the same way as the standard autopilot to avoid undesired function disengagements, which would occur if any of the inceptors are moved into any direction.

In the event of any unexpected failure combination that results in loss of function, the crew is alerted through a standard autopilot aural warning, visual indications on Flight Mode Annunciators (FMA) and Crew Alerting System (CAS) messages. An independent flight director still provides guidance to be followed by the pilot in this scenario.

ETS Longitudinal Control

An objective of example non-limiting implementations is to optimize the longitudinal control surfaces deflection to provide the maximum climb rate to the aircraft.

Figure 3:
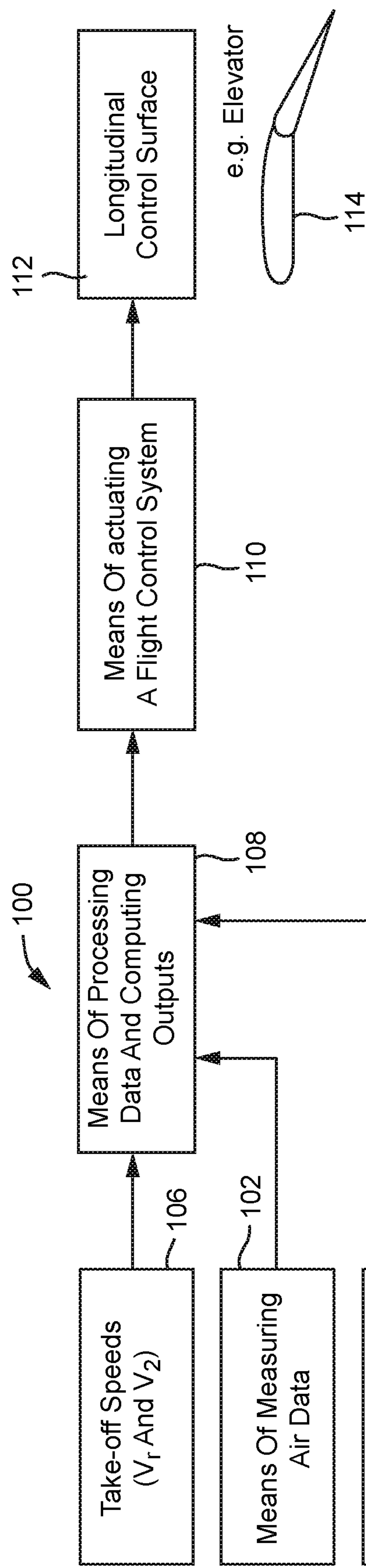
FIG. 3 shows an overall example non-limiting system including an enhanced takeoff system (ETS) setup.

FIG. 3 is a schematic block hardware or system component diagram of an overall aircraft control system 100. This example non-limiting implementation uses means 102 for measuring air data (e.g., probes), a means of measuring aircraft inertial information comprising an inertial measuring system (e.g., AHRS) for measuring aircraft inertial information 104 and means of processing data and computing outputs 108 (e.g., a conventional flight computer) for computing the longitudinal control surfaces deflection. All of this information is processed in some electronic device such as, but not limited to, a conventional Fly-By-Wire processor 108. Such a processor may for example execute instructions stored in non-transitory memory such as a flash or other volatile or non-volatile memory device. The processor 108 generates commands which it sends to a means for actuating a flight control system 110 (e.g., a hydraulic or electromechanical actuator) to control the longitudinal control surface 112 such as an elevator 114.

Figure 4:
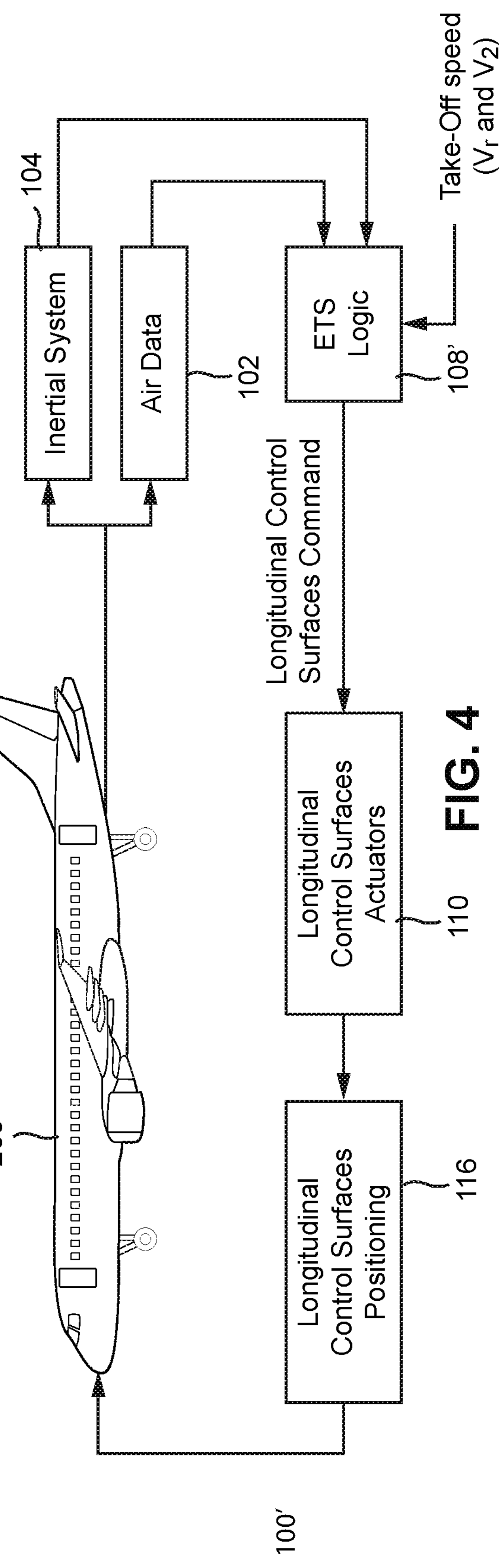
FIG. 4 shows an example ETS diagram.
Figure 4A:
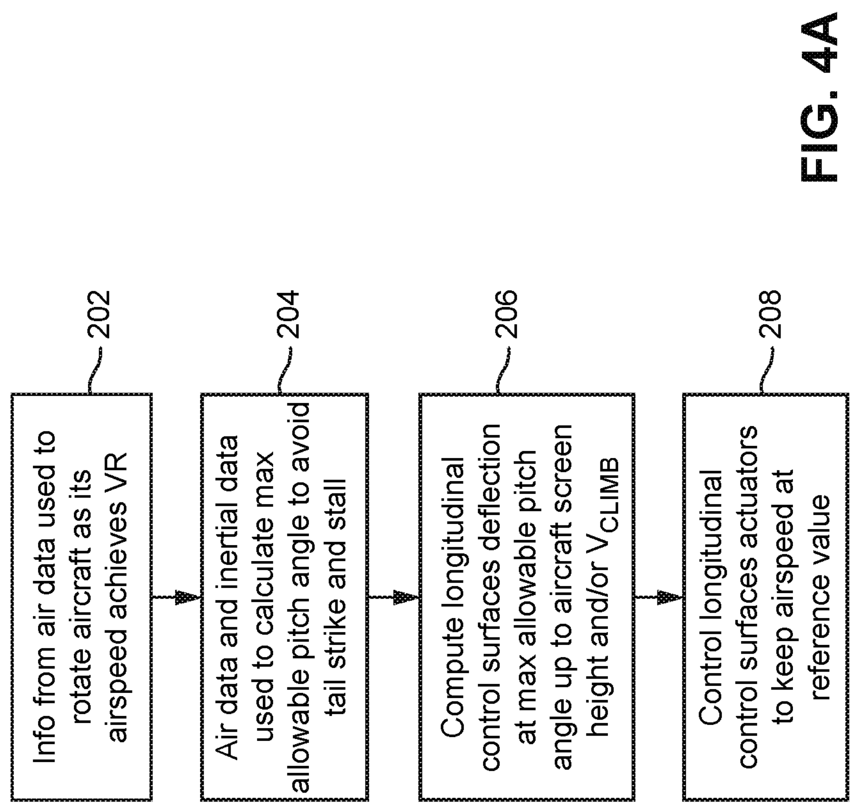
FIG. 4A shows an example non-limiting flowchart.

FIG. 4 presents a diagram relating the aircraft 200 and the ETS system 100' and FIG. 4A shows a corresponding flowchart. Information obtained from the air data 102 is used to rotate the aircraft as its airspeed achieves a pre-defined rotation speed (Vr) (FIG. 4A block 202). Information obtained from the air data 102 and the inertial system 104 are fed back to permit the ETS logic 108' to compute the maximum allowable pitch angle which does not cause the aircraft tail to touch the ground as it rotates and also prevents the aircraft maximum angle of attack to not exceed the aircraft stall limits (FIG. 4A block 204).

The ETS control logic 108' computes the necessary longitudinal control surfaces deflection to control the aircraft at this maximum allowable pitch angle up to the aircraft screen height and/or a pre-defined climb speed ($V_{climb}$) (FIG. 4A block 206). From this point, the system controls the longitudinal control surface actuators 110 to keep the airspeed at another reference value (e. g., $V_2$, $V_{climb}$, etc.) (FIG. 4A block 208).

ETS Lateral-Directional Control

Figure 5:
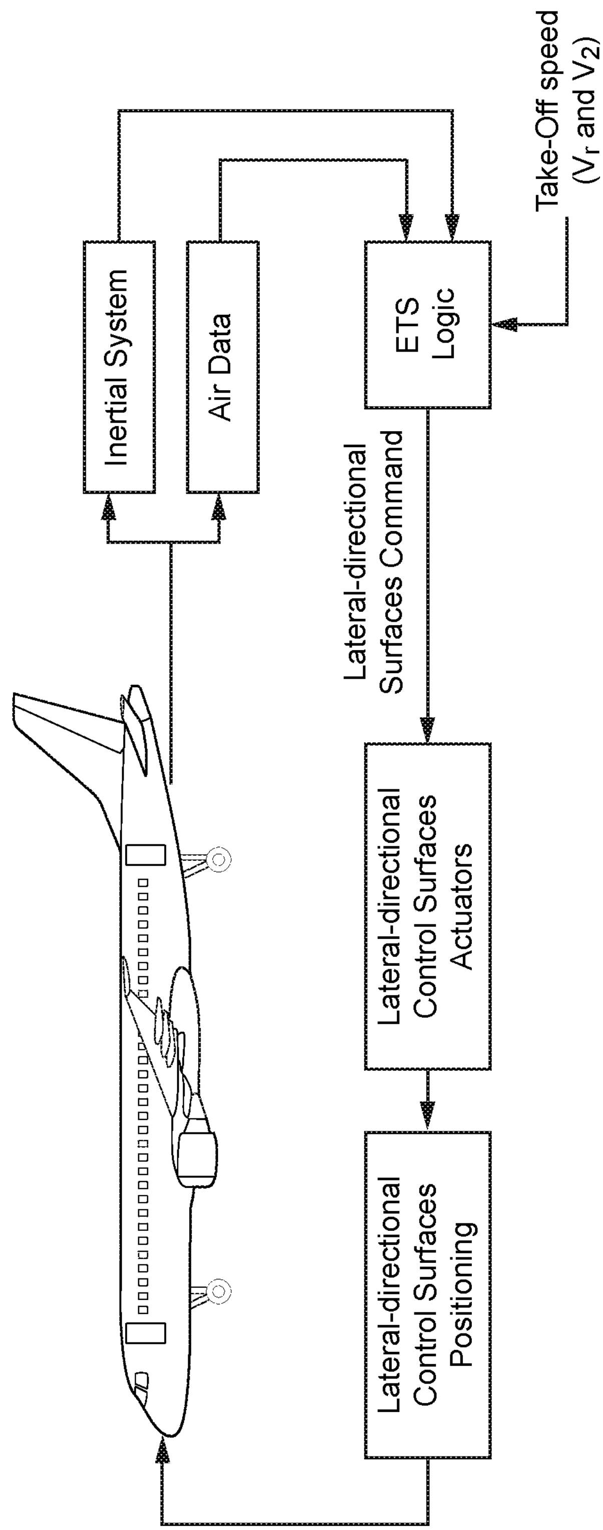
FIG. 5 shows an example ETS lateral-directional logic diagram.
Figure 5A:
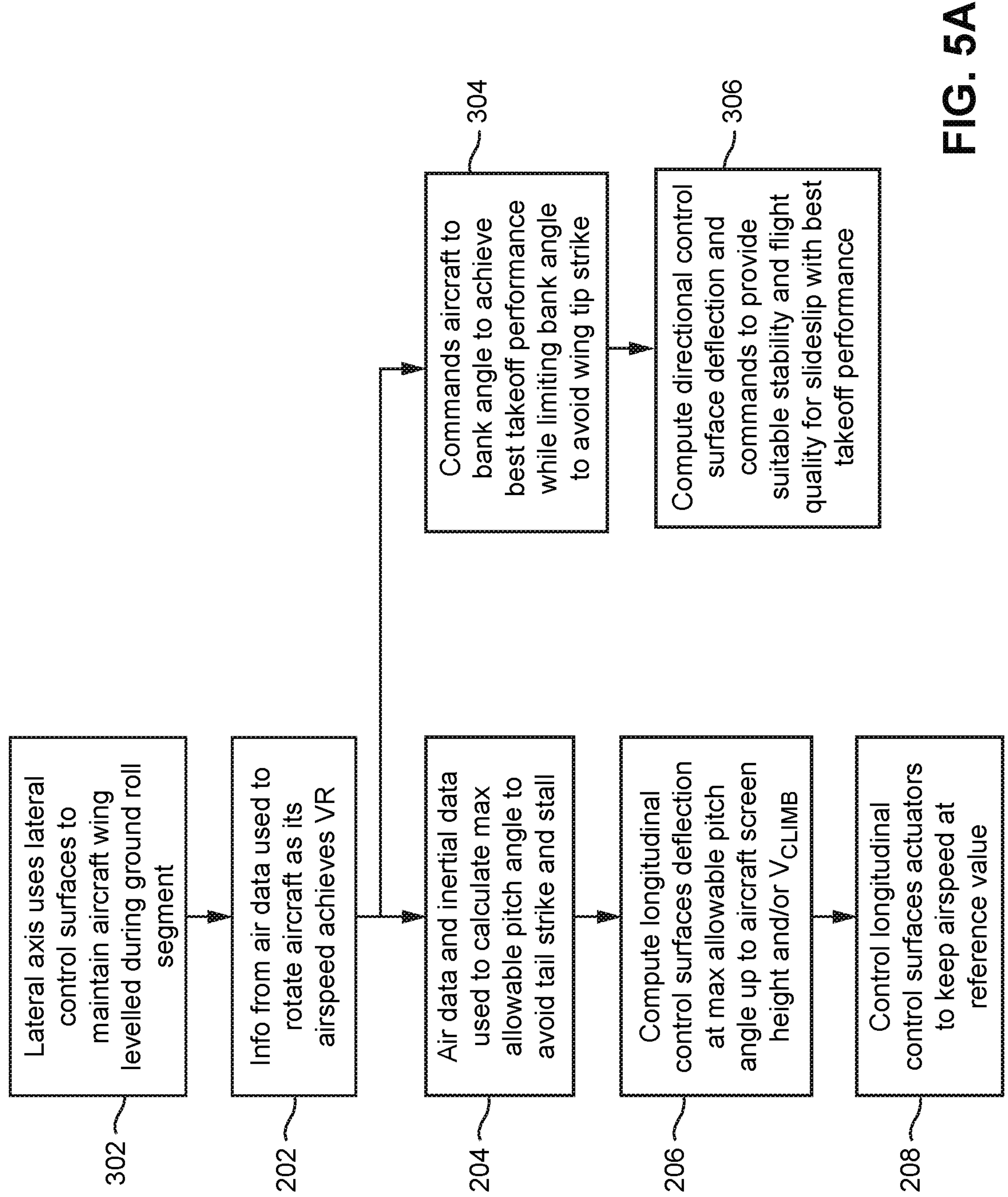
FIG. 5A shows an example non-limiting flowchart.

The non-limiting example technology herein includes an additional control loop shown in FIG. 5 which proposes for the lateral axis to use the lateral control surfaces to maintain the aircraft wing leveled during the ground roll segment (FIG. 5A block 302). After the lift-off, the example non-limiting embodiment commands the aircraft 200 to the bank angle in which the best take-off performance is achieved, limiting the bank angle to avoid the wing tips hitting the ground (FIG. 5A block 304).

The system computes the directional control surfaces deflection in order to provide for the aircraft some level of augmented stability and controllability during the ground roll segment (block 302). After lift-off, the ETS logic 108" computes directional control surface deflection and commands in order to provide suitable stability and flight quality in the pursuit of the sideslip in which the best take-off performance is achieved (block 306).

This uses means for measuring inertial signals (e.g., Inertial System 104) and air data signal (e.g., probes) 102 to compute the lateral and directional surfaces deflection by processing the measured signals in some electronic device such as, but not limited to, the Fly-By-Wire processor 108.

ETS Performance Improvement

As previously stated, the following performance improvements are provided:

1) Takeoff speeds reduction: There are some margins imposed by Certification Authority (FAA) created in order to guarantee that some pilot errors do not affect takeoff safety. Since, with automatic takeoff, there is no pilot action, it is possible suppress these speed margins. In doing so, the takeoff distance (TOD) should be reduced and, as a consequence, the takeoff weight (TOW) could be increased.

2) Takeoff Mistrim: An aircraft is capable of flying because the lift produced by the wing equals the aircraft weight. On the other hand, the lift is generated at the center of pressure and does not act in the same vertical as the weight, at the center of gravity (CG) (see FIG. 6). The consequence is a moment that leads to a nose pitch down. In order to counteract this movement, it is helpful to have a small (moveable) wing in the tail, namely a horizontal stabilizer (HSTAB) that produces an opposite moment. When the resultant moment is zero, the aircraft is said to be trimmed.

In the usual manual takeoff, the aircraft is trimmed at takeoff producing zero force in the column, in order to reduce pilot workload.

Since, in the automatic takeoff, there is no pilot action, the horizontal stabilizer (HSTAB) can be set in a non-trimmed condition—named "mistrim". The pitch up mistrim helps the aircraft to achieve the best takeoff performance due to a greater pitch rate.

3) Best beta for optimum climb at takeoff: Since the engines of an aircraft are generally placed some distance from the central airframe axis, the OEI condition generates an asymmetric thrust and drag configuration, which results in increased overall drag. This drag increase is a result of a sideslip (Beta) angle and rudder deflection angle in combination with a roll (Phi) angle. For a given airspeed, there are infinite possible combinations of Beta, rudder deflection and Phi, which will result in different overall drag forces.

In previous non-limiting scenarios, the pilot is responsible for pursuing and keeping these values of Beta and Phi manually.

In the current non-limiting OEI scenario, the avionics sends a signal to the Primary Flight Display PFD with the value of a pre-calculated optimum Beta angle that reduces drag for a given speed.

This guidance is shown to the pilot that acts over the aircraft controls in order to pursue this Beta and Phi angles, thus minimizing drag.

The Optimum Beta indication will only be present when:

In-air

Landing gear LG is not down-locked

Thrust Levers in TO (takeoff) configuration

Takeoff Flaps

Because of these restrictions, the asymmetry drag reduction obtained with the function can be realized from the 2nd segment only.

The proposed non-limiting features provide means through which the aircraft can automatically follow a pre-determined (tabulated) set of Beta and Phi values from the very first moment after the aircraft lifts off the ground, using a given control law architecture.

This implementation provides some benefits:

Automatic control is smoother, more precise and with faster responses, thus producing less drag Since the automatic control can be implemented to pursue the targets as soon as the aircraft lifts off, aircraft performance is enhanced by taking credit of the drag reduction from this moment onward, namely, the 1st Segment of the takeoff The proposed control law senses aircraft attitude and accelerations through sensors. It then computes the amount of command necessary to pursue these Beta and Phi values, sending signals to the control surfaces actuators.

The automatic control law then controls these surface deflections in order to precisely track the pre-determined optimum values of Beta and Phi.

Affected control surfaces are the ones responsible for YAW and ROLL movements, which could be, but not limited to:

Ailerons

Rudder

Spoilers

Spoilerons

Ailevators

Flaperons

Figure 6:
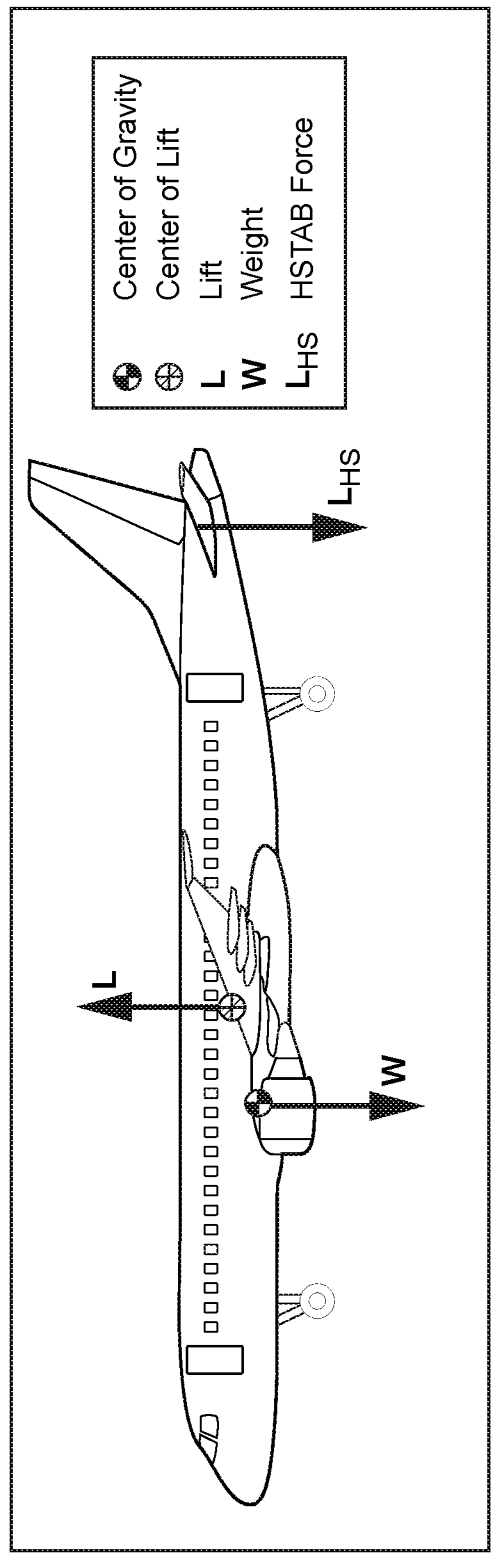
FIG. 6 shows aircraft forces.
Figure 7:
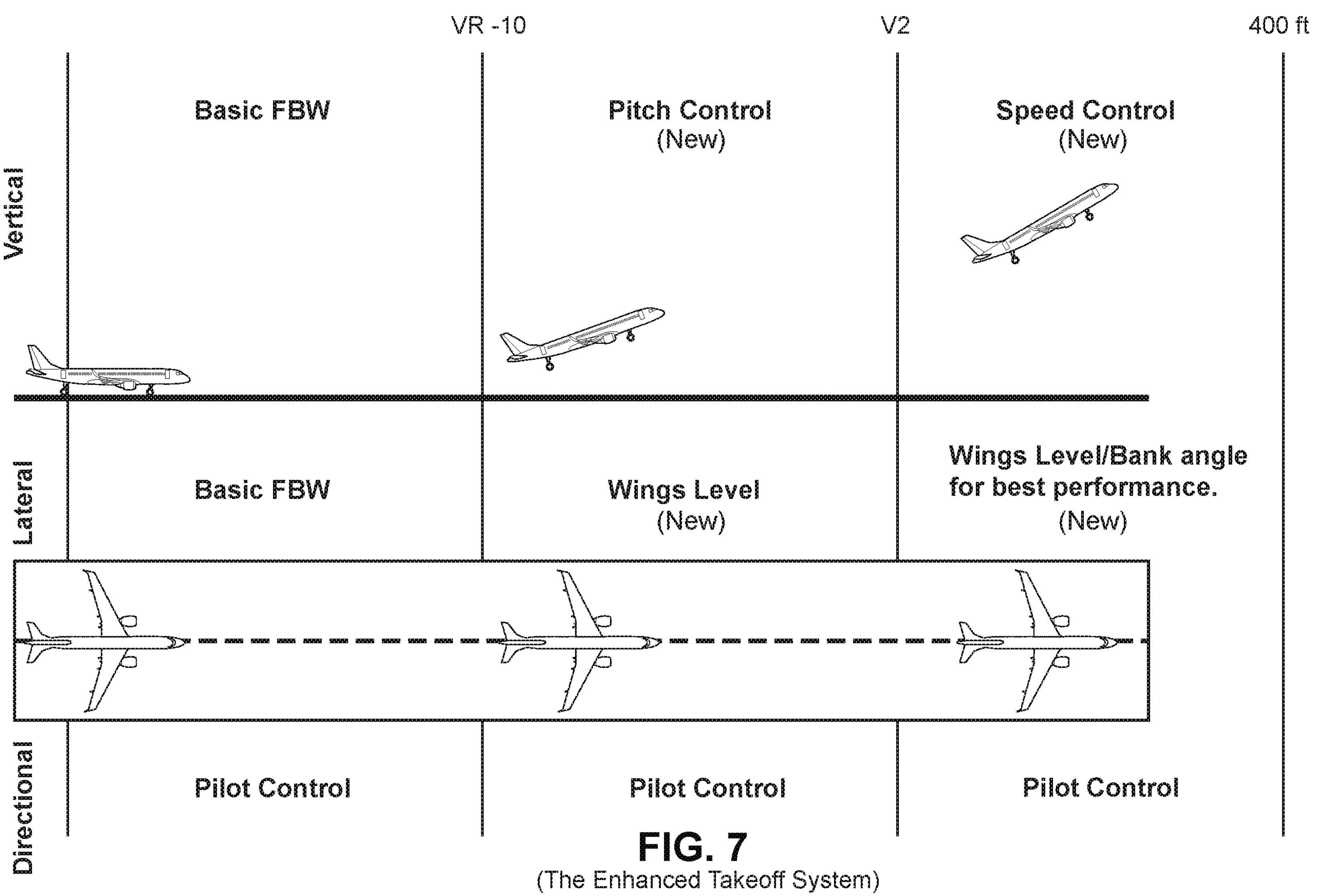
FIG. 7 shows an example non-limiting operating diagram.

FIG. 6 shows example forces acting on aircraft 200. FIG. 7 shows new pitch and speed control and lateral wings level functionality of the example non-limiting ETS system augmenting the basic preexisting fly-by-wire (FBW) functionality to provide wings level and/or wings level/bank angle for best performance.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An automatic takeoff system configured to reduce takeoff distance of an aircraft of the type including control surfaces and a tail having a horizontal stabilizer thereon, the system comprising:

a fly-by-wire system connected to control the control surfaces and the horizontal stabilizer, the fly-by-wire system comprising at least one processor coupled to receive input signals from at least one air data measuring sensor and at least one inertial sensor, the at least one processor accessing takeoff speed values VR and V2 to automatically provide, via the fly-by-wire system, both longitudinal and lateral-directional control surface control to provide automatic takeoff of the aircraft during ground roll through rotation up to a screen height, the fly-by-wire system configured to:

(a) use data from the at least one air data measuring sensor to automatically rotate the aircraft in response to airspeed of the aircraft achieving a pre-defined rotation speed, (b) automatically apply non-neutral horizontal stabilizer trim control to mistrim the horizontal stabilizer in a pitch-up mistrimmed position during automatic rotation of the aircraft, the pitch-up mistrim of the type that produces a non-zero force at pilot controls; and (c) compute longitudinal control surface deflection and use the computed longitudinal control surface deflection to automatically control amount of pitch of the aircraft up to the aircraft screen height, which controlled pitch amount does not cause a tail strike as the aircraft automatically rotates and once the aircraft is airborne does not cause the aircraft to stall.

2. The automatic takeoff system of claim 1 wherein the at least one processor prevents the aircraft maximum angle of attack from exceeding the aircraft stall limits up to a predefined climb speed.

3. The automatic takeoff system of claim 2 wherein the at least one processor controls longitudinal control surface actuators connected to actuate the control surfaces to keep the airspeed of the aircraft at a reference level upon detecting the aircraft has reached the predefined climb speed.

4. The automatic takeoff system of claim 1 wherein the at least one processor controls lateral control surfaces to maintain an aircraft wing leveled during a ground roll segment.

5. The automatic takeoff system of claim 1 wherein the at least one processor is further configured to automatically command the aircraft to a bank angle, and to limit the bank angle to avoid the wing tips hitting the ground.

6. The automatic takeoff system of claim 1 wherein the at least one processor computes directional control surface deflection in order to automatically augment stability and controllability during a ground roll segment.

7. The automatic takeoff system of claim 1 wherein the system reduces takeoff distance by setting the horizontal stabilizer in a pitch-up mistrimmed position during rotation, thereby enabling increase in takeoff weight.

8. The automatic takeoff system of claim 1 wherein the at least one processor is configured to supply a beta indication to minimize drag when the aircraft is in-air but has not yet attained the aircraft screen height, all engines are operating, landing gear is not down-locked, thrust levers are in takeoff configuration, and flaps are in takeoff position, and the at least one processor is further configured to also provide a predetermined Beta and Phi value beginning when the aircraft lifts off the ground.

9. The automatic takeoff system of claim 8 wherein the automatic takeoff system provides asymmetrical drag reduction upon takeoff by controlling control surfaces responsible for yaw and roll including at least some of ailerons, rudder, spoilers, spoilerons, ailevators, and flaperons.

10. The system of claim 1 wherein the at least one processor closes a control feedback loop around pitch angle.

11. The system of claim 10 wherein the at least one processor is further configured to implement an additional control loop for a lateral axis to use the lateral control surfaces to maintain the aircraft wing leveled during a ground roll segment.

12. The system of claim 1 wherein the at least one processor is further configured during the automatic takeoff to operate for automatic rotation outside of Federal Aviation Administration mandated speed margins for the aircraft.

13. The system of claim 1 wherein the at least one processor is further configured to automatically provide wings level operation during the ground roll and automatically prepare bank angle for climb before the aircraft ascends to screen height.

14. An automatic takeoff method for achieving reduced takeoff distance of an aircraft including control surfaces and a tail having a horizontal stabilizer thereon, the method comprising:

automatically provide longitudinal and lateral-directional control surface control during ground roll of the aircraft while automatically applying non-neutral horizontal stabilizer trim control to mistrim the horizontal stabilizer in a pitch-up mistrimmed position during automatic rotation of the aircraft, the pitch-up mistrimmed position producing a non-zero force at pilot controls;

automatically rotate the aircraft without pilot intervention to provide automatic takeoff of the aircraft while still applying the non-neutral horizontal stabilizer trim control to mistrim the horizontal stabilizer in the pitch-up mistrimmed position; and use computed longitudinal control surface deflection to control pitch of the aircraft to prevent the aircraft tail from striking the ground as the aircraft automatically rotates and once the aircraft is airborne to ensure the aircraft does not exceed stall limits.

15. The method of claim 14 further including preventing aircraft maximum angle of attack from exceeding the aircraft stall limits up to a predefined climb speed.

16. In an aircraft including an inceptor that controls control surfaces and a tail having a horizontal stabilizer thereon, an automatic takeoff system comprising:

a fly-by-wire controller connected to actuate the control surfaces and the horizontal stabilizer, the fly-by-wire controller being configured to automatically provide longitudinal and lateral-directional control surface control during ground roll of the aircraft while automatically applying non-neutral horizontal stabilizer trim control to mistrim the horizontal stabilizer in a pitch-up mistrimmed position that produces a non-zero force at the inceptor;

the fly-by-wire controller being further configured to automatically rotate the aircraft without any pilot intervention to provide automatic takeoff of the aircraft while still applying the non-neutral horizontal stabilizer trim control to mistrim the horizontal stabilizer in the pitch-up mistrimmed position producing the non-zero force at the inceptor;

the fly-by-wire controller being further configured to use computed longitudinal control surface deflection to automatically control pitch of the aircraft as the aircraft automatically rotates to prevent the aircraft tail from striking the ground and once the aircraft is airborne to prevent the aircraft from exceeding stall limits.

* * * * *